US010728456B2

(12) United States Patent
Otomo et al.

(10) Patent No.: US 10,728,456 B2
(45) Date of Patent: Jul. 28, 2020

(54) OPTICAL UNIT AND OPTICAL DEVICE

(71) Applicant: NIDEC SANKYO CORPORATION, Suwa-gun, Nagano (JP)

(72) Inventors: Yuta Otomo, Suwa-gun, Nagano (JP); Ryoji Komatsu, Suwa-gun, Nagano (JP)

(73) Assignee: NIDEC SANKYO CORPORATION, Suwa-Gun, Nagano (JP)

( * ) Notice: Subject to any disclaimer, the term of this patent is extended or adjusted under 35 U.S.C. 154(b) by 126 days.

(21) Appl. No.: 15/980,219

(22) Filed: May 15, 2018

(65) Prior Publication Data
US 2018/0332228 A1 Nov. 15, 2018

(30) Foreign Application Priority Data

May 15, 2017 (JP) ................. 2017-096532

(51) Int. Cl.
| H04N 5/232 | (2006.01) |
| H04N 7/10 | (2006.01) |
| G02B 7/02 | (2006.01) |
| G02B 27/64 | (2006.01) |
| H04N 5/225 | (2006.01) |

(52) U.S. Cl.
CPC ......... *H04N 5/23287* (2013.01); *G02B 7/028* (2013.01); *G02B 27/646* (2013.01); *H04N 5/2254* (2013.01); *H04N 5/2257* (2013.01); *H04N 7/10* (2013.01)

(58) Field of Classification Search
CPC ............. H04N 5/23287; H04N 5/2257; H04N 5/2254; H04N 7/10; G02B 27/646; G02B 7/028; G03B 5/00
See application file for complete search history.

(56) References Cited

U.S. PATENT DOCUMENTS

| 2002/0080242 | A1* | 6/2002 | Takahashi | H04N 5/217 348/207.99 |
| 2010/0271927 | A1* | 10/2010 | Furuichi | G11B 7/08582 369/112.24 |
| 2016/0073024 | A1* | 3/2016 | Yamamoto | H04N 5/23229 348/36 |

FOREIGN PATENT DOCUMENTS

JP      2011081288 A      4/2011

* cited by examiner

*Primary Examiner* — Mekonnen D Dagnew
(74) *Attorney, Agent, or Firm* — Cantor Colburn LLP

(57) ABSTRACT

An optical unit may include a movable body having an optical element, a support body movably supporting the movable body, a detecting part to detect a variation of a tilt of the movable body, a drive mechanism to change a tilt of the movable body, an output part to connect with an external device, a control part to control the drive mechanism based on the variation detected by the detecting part to correct the tilt by the drive mechanism, and an output control part to create information regarding the variation as a signal equivalent to drive signal data which are outputted to the drive mechanism for correcting the tilt from the control part and output the information to the external device during a period when the control part makes the drive mechanism correct the tilt. An optical system comprises the optical unit and the external device.

20 Claims, 9 Drawing Sheets

| Swing Drive Mechanism Control Part | | Correction Angle | USB Output Data Value | |
|---|---|---|---|---|
| Duty | Decimal Number | ° | Decimal Number | Hexadecimal Number |
| 100% | 1024 | Changeable Depending on Each Actuator | 2048 | 0x800 |
| \| | \| | | \| | \| |
| 50% | 512 | | 1536 | 0x600 |
| \| | \| | | \| | \| |
| 25% | 256 | | 1280 | 0x500 |
| \| | \| | | \| | \| |
| 0 | 0 | | 1024 | 0x400 |
| \| | \| | | \| | \| |
| -25% | -256 | | 768 | 0x300 |
| \| | \| | | \| | \| |
| -50% | -512 | | 512 | 0x200 |
| \| | \| | | \| | \| |
| -100% | -1024 | | 0 | 0x000 |

FIG. 6

OPTICAL UNIT AND OPTICAL DEVICE

CROSS REFERENCE TO RELATED APPLICATION

The present application claims priority under 35 U.S.C. § 119 to Japanese Application No. 2017-096532 filed May 15, 2017, the entire content of which is incorporated herein by reference.

FIELD OF THE INVENTION

At least an embodiment of the present invention may relate to an optical unit and an optical system.

BACKGROUND

In Patent Literature 1 (Japanese Patent Laid-Open No. 2011-81288), a photographing optical device is disclosed which includes a lens drive device on which a lens, an imaging element, and a lens drive mechanism structured to drive the lens are mounted, a support body which supports the lens drive device, a sensor structured to detect a variation of a tilt of the lens drive device, a shake correction mechanism structured to swing the lens drive device with respect to the support body to correct a shake based on a detected result of the sensor, a shake control part structured to control the shake correction mechanism based on the detected result of the sensor, and an external terminal structured to output an output signal from the sensor to the outside.

In the photographing optical device disclosed in Patent Literature 1, during control of a shake correction by the shake correction mechanism, a detection output by the sensor becomes zero and thus an external device is unable to obtain a tilt of the lens drive device with respect to the support body. In other words, the photographing optical device is unable to inform the external device of a tilt of the lens drive device with respect to the support body.

SUMMARY

In view of the problem described above, at least an embodiment of the present invention provides an optical unit and an optical system which are capable of informing an external device of a variation of a tilt angle of the movable body during control of a shake correction.

In order to solve the above-mentioned problem, at least an embodiment of the present invention provides a first optical unit including a movable body on which an optical element is mounted, a support body which movably supports the movable body, a detecting part structured to detect a variation of a tilt of the movable body with respect to the support body, a drive mechanism structured to change a tilt of the movable body with respect to the support body, an output part which is to be connected with an external device, a control part structured to control the drive mechanism based on the variation detected by the detecting part to correct the tilt by the drive mechanism, and an output control part structured to create information regarding the variation as a signal equivalent to drive signal data which are outputted to the drive mechanism for correcting the tilt from the control part and output the information to the external device during a period when the control part makes the drive mechanism correct the tilt. According to the first optical unit in accordance with at least an embodiment of the present invention, a variation (relative value) of a tilt angle of the movable body can be informed to the external device during control of a shake correction.

A second optical unit in accordance with at least an embodiment of the present invention further includes a storage part stored with a table in which the drive signal data and an angle of the tilt correspond to each other, and the table is outputted from the optical unit to the external device and is stored in the external device, and the drive signal data are outputted from the control part to the external device and converted into a tilt angle by using the table in the external device. In the second optical unit in accordance with at least an embodiment of the present invention, a variation (absolute value) of a tilt angle of the movable body can be informed to the external device by using the drive signal data and the table.

In a third optical unit in accordance with at least an embodiment of the present invention, in addition, the table is set based on a result of measurement at the time of manufacturing. In the third optical unit in accordance with at least an embodiment of the present invention, the table is set based on a result of measurement at the time of manufacturing and thus a variation of a tilt angle can be informed to the external device with a high degree of accuracy depending on its individual variation.

A fourth optical unit in accordance with at least an embodiment of the present invention further includes a temperature detection part structured to detect an internal temperature, and a plurality of tables is provided so as to correspond to temperatures detected by the temperature detection part. In the fourth optical unit in accordance with at least an embodiment of the present invention, the table is set based on the internal temperature and thus a variation of a tilt angle can be informed to the external device with a high degree of accuracy depending on temperature change.

A fifth optical unit in accordance with at least an embodiment of the present invention further includes a storage part stored with a calculation expression in which the drive signal data and an angle of the tilt correspond to each other, the calculation expression is outputted from the optical unit to the external device and is stored in the external device, and the drive signal data are outputted from the control part to the external device and converted into a tilt angle by using the calculation expression in the external device. In the fifth optical unit in accordance with at least an embodiment of the present invention, an absolute value of a tilt angle of the movable body can be informed to the external device by using the drive signal data and the calculation expression.

In a sixth optical unit in accordance with at least an embodiment of the present invention, in addition, the calculation expression is set based on a result of measurement at a time of manufacturing. In the sixth optical unit in accordance with at least an embodiment of the present invention, the calculation expression is set based on a result of measurement at the time of manufacturing and thus a variation of a tilt angle can be informed to the external device with a high degree of accuracy depending on its individual variation.

A seventh optical unit in accordance with at least an embodiment of the present invention further includes a temperature detection part structured to detect an internal temperature, and a plurality of calculation expressions is provided so as to correspond to temperatures detected by the temperature detection part. In the seventh optical unit in accordance with at least an embodiment of the present invention, the calculation expression is set based on the internal temperature and thus a variation of a tilt angle can be informed to the external device with a high degree of accuracy depending on temperature change.

An eighth optical unit in accordance with at least an embodiment of the present invention further includes a USB terminal structured to connect with the external device and the optical unit outputs image signal data together with the information regarding the variation to the external device through the USB terminal. In the eighth optical unit in accordance with at least an embodiment of the present invention, data can be outputted to the external device through a standard specification which is USB (Universal Serial Bus).

An optical system in accordance with at least an embodiment of the present invention includes one of the above-mentioned optical units and an external device which is connected with the detecting part structured to detect a variation of the tilt. According to the optical system in accordance with at least an embodiment of the present invention, the external device is capable of obtaining a variation of a tilt angle of the movable part structuring the optical unit during control of a shake correction.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6 is a table showing a relationship between an output of a swing drive mechanism control part, a data value (information regarding a variation of a tilt) outputted to an external device, and a correction angle in accordance with an embodiment of the present invention.

DETAILED DESCRIPTION (Outline)

Figure 1:
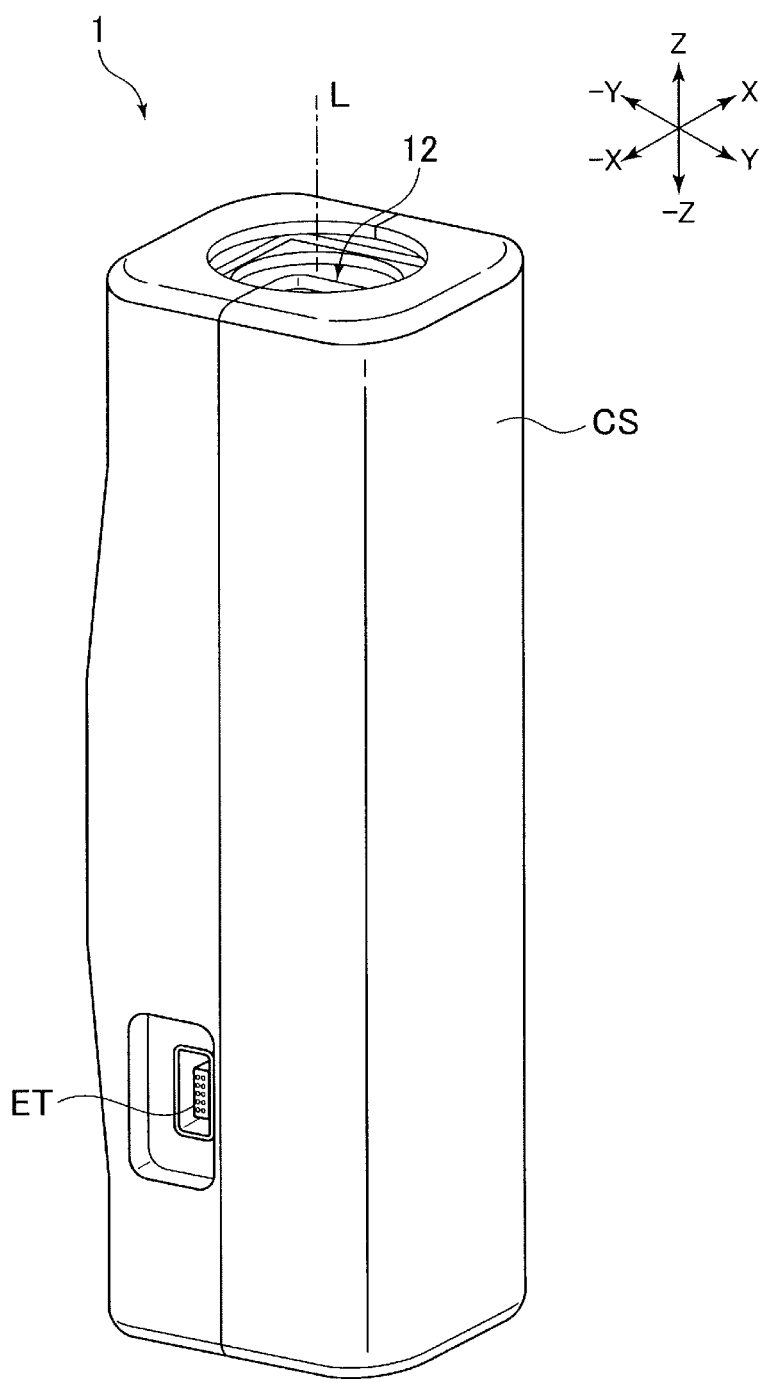
FIG. 1 is a perspective view showing a photographing optical device in accordance with an embodiment of the present invention.

A photographing optical device 1 (example of an optical unit) in accordance with an embodiment of the present invention will be described below with reference to the accompanying drawings. First, a structure of the photographing optical device 1 will be described below. Next, an operation of the photographing optical device 1 in this embodiment will be described. Next, effects in this embodiment will be described. Next, modified embodiments will be described.

(Structure)

In a photographing optical device 1 in this embodiment, as shown in FIG. 1 through FIG. 5, an optical module 100, respective control parts (described below), and a USB terminal "ET" (example of an output part) are accommodated in an inside of a case "CS". The optical module 100 includes a lens drive device 2 (example of a movable body), an angular velocity sensor 4 (example of a detecting part), a support body 5, and a swing drive mechanism 6 (example of a drive mechanism). A lens (not shown) and an imaging element 30 are mounted on the lens drive device 2. The angular velocity sensor 4 has a function for detecting a variation of a tilt of the lens drive device 2. In other words, the angular velocity sensor 4 has a function which detects a variation of a tilt of the lens drive device 2 with respect to the support body 5. The support body 5 movably supports the lens drive device 2. The swing drive mechanism 6 has a function which swings the lens drive device 2. In other words, the swing drive mechanism 6 has a function which changes a tilt of the lens drive device 2 with respect to the support body 5. In this embodiment, the photographing optical device 1 is, as an example, a so-called module tilt type device structured to perform a shake correction by swinging the lens drive device 2 during control of a shake correction.

Figure 2:
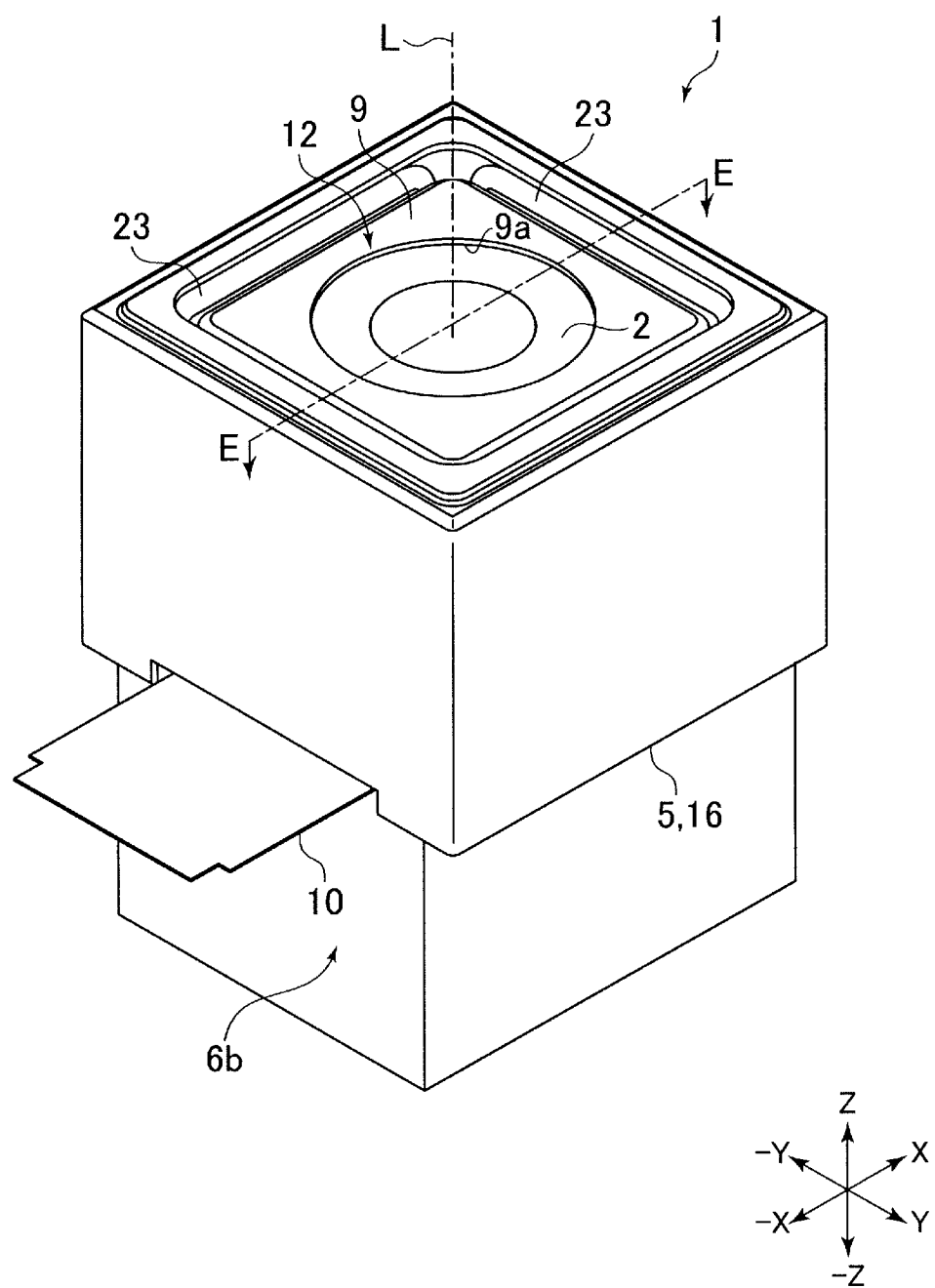
FIG. 2 is a perspective view showing a portion of a photographing optical device from which a case is detached in accordance with an embodiment of the present invention.
Figure 5:
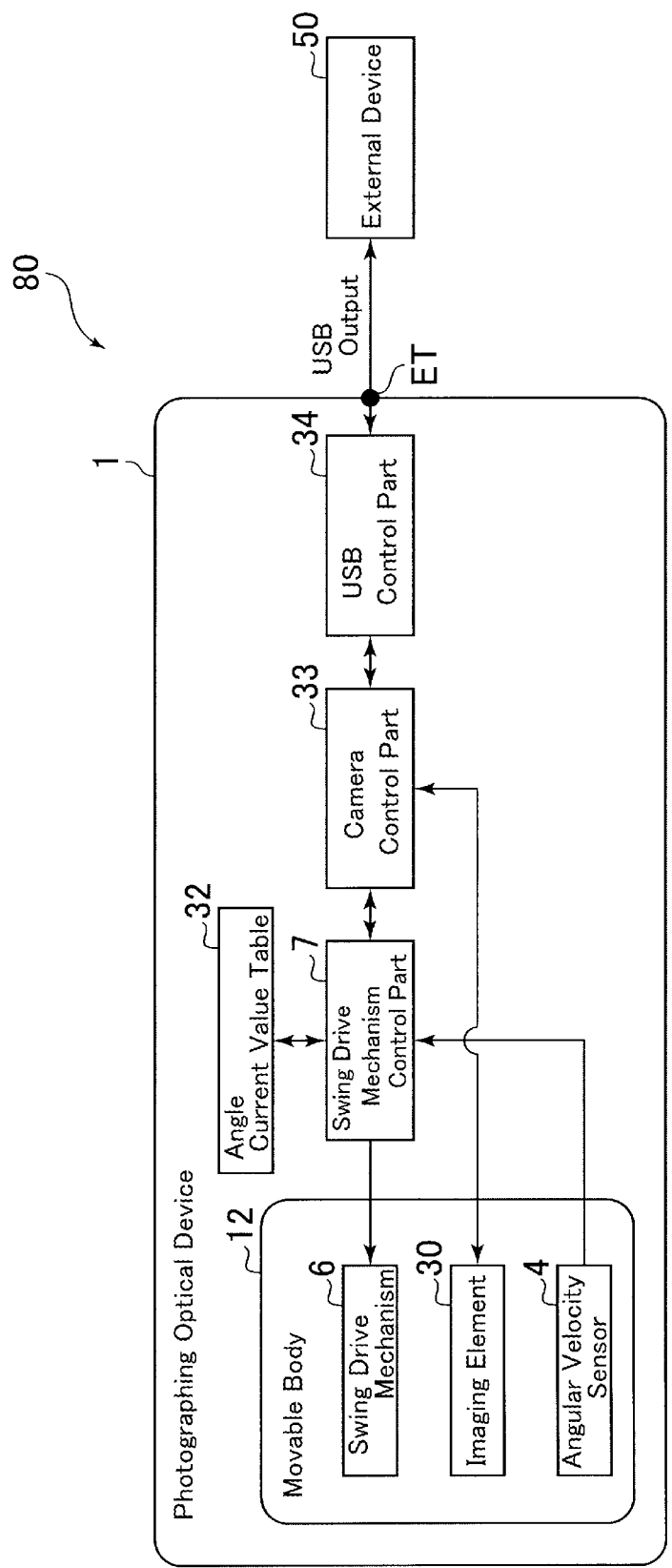
FIG. 5 is a block diagram showing a relationship between respective structural elements which structure a photographing optical device in accordance with an embodiment of the present invention and an external device which does not structure the photographing optical device.

Further, the photographing optical device 1 includes, as shown in FIG. 5, a swing drive mechanism control part 7 (example of a control part) structured to drive the swing drive mechanism 6, an angle current value table 32 (example of a table), a camera control part 33, and a USB control part 34 (example of an output control part). In this embodiment, the camera control part 33 has a function which controls the imaging element 30 (see FIG. 5). Further, in this embodiment, an upper and lower direction is coincided with a direction of an optical axis "L" of the lens drive device 2 (optical axis direction) when the lens drive device 2 is not swung. In the following descriptions, as shown in FIG. 2, respective three directions perpendicular to each other are referred to as an "X" direction ("X" direction and "−X" direction), a "Y" direction ("Y" direction and "−Y" direction), and a "Z" direction ("Z" direction and "−Z" direction). Further, the "X" direction side is referred to as a "right" side, the "−X" direction side is referred to as a "left" side, the "Y" direction side is as a "front" side, the "−Y" direction side is as a "rear" side, the "Z" direction side is as an "upper" side, and the "−Z" direction side is as a "lower" side. In this embodiment, the photographing optical device 1 is, as shown in FIG. 5, connected with an external device 50 through the USB terminal "ET". Specifically, the swing drive mechanism control part 7 in this embodiment is connected with the external device 50 through the camera control part 33, the USB control part 34 and the USB terminal "ET". In other words, the swing drive mechanism control part 7 is indirectly connected with the external device 50. Further, as described above, the swing drive mechanism control part 7 is structured to drive the swing drive mechanism 6. Therefore, the swing drive mechanism control part 7 has a function which controls the swing drive mechanism 6 based on a variation of a tilt of the lens drive device 2 detected by the angular velocity sensor 4 so that the swing drive mechanism 6 corrects the tilt of the lens drive device 2.

(Lens Drive Device)

The lens drive device 2 in this embodiment is, as an example, mounted with the lens and the imaging element 30 as described above. Specifically, the lens is mounted on an upper end side of the lens drive device 2, and the imaging element 30 is mounted at a lower end of the lens drive device 2.

The lens drive device 2 is, as shown in FIG. 2, formed in a cubic shape as a whole. Four side faces on an upper side of the lens drive device 2 are covered by a cover member 9 which is formed in a substantially rectangular tube shape with a bottom and whose lower end is opened. A circular through-hole 9a is formed in a bottom part of the cover member 9 which is disposed on an upper end side. Further, a lower end of the cover member 9 is formed with a flange part 9b which is enlarged toward an outer side in a front and rear direction and toward an outer side in a right and left direction. The four side faces of the cover member 9 is formed in substantially parallel to the optical axis direction, and each of the respective side faces is fixed with a drive magnet 21 described below which structures the swing drive mechanism 6.

(Angular Velocity Sensor)

Figure 3:
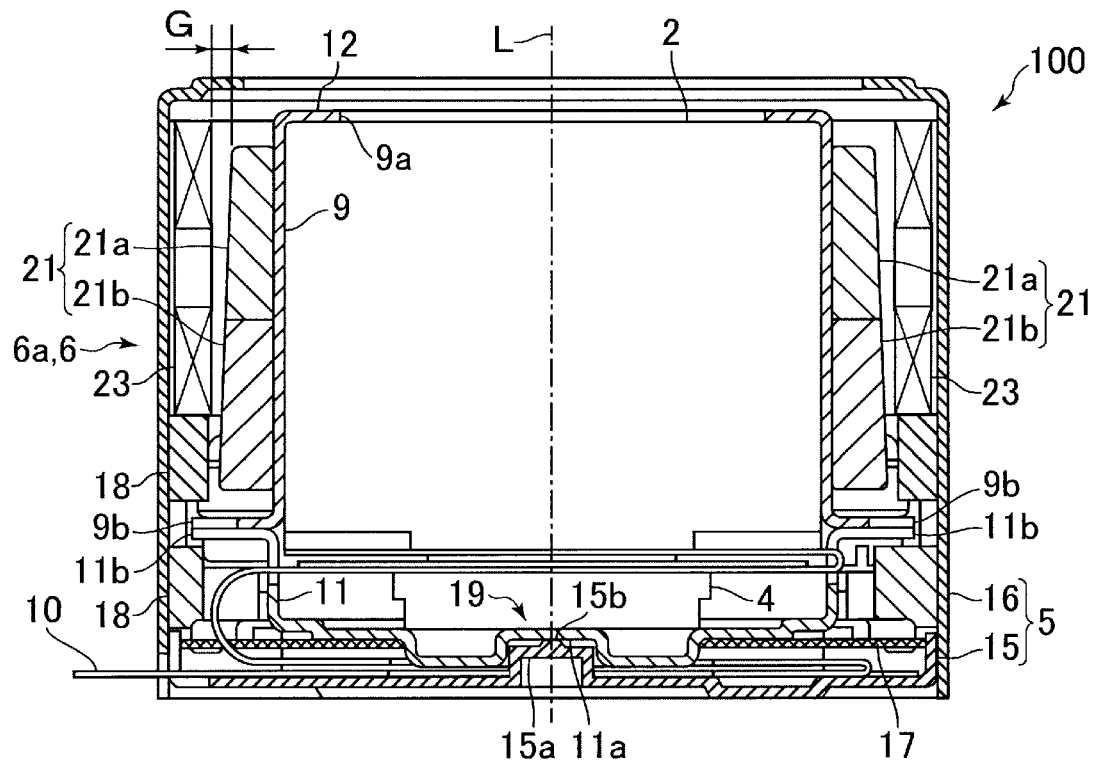
FIG. 3 is a cross-sectional view showing a part of the photographing optical device in FIG. 2 which is cut by the "E-E" cutting line.
Figure 3:
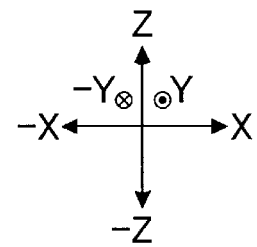

The angular velocity sensor 4 in this embodiment is, as an example, a gyroscope structured to detect a variation of a tilt of the lens drive device 2. The angular velocity sensor 4 is, as shown in FIG. 3, disposed on a lower side of the lens drive device 2. The angular velocity sensor 4 is connected with a flexible printed circuit board 10 (hereinafter, referred to as an FPC 10). The FPC 10 is extended around at a center in a height direction of the photographing optical device 1 and is extended out from one side face (left side face) of the photographing optical device 1.

Further, the angular velocity sensor 4 is, as shown in FIG. 3, disposed in an inside of a sensor cover member 11 formed in a substantially rectangular tube shape with a bottom which is flat and whose upper end is opened. A center of a bottom part of the sensor cover member 11 which is disposed on a lower end side is formed with a contact face 11a in a flat face shape with which a supporting point projection 15b described below is contacted. In this embodiment, the flange part 9b and the flange part 11b are fixed to each other, and the sensor cover member 11 is fixed to a lower end of the cover member 9.

The angular velocity sensor 4 is, as shown in FIG. 3, swingably supported together with the lens drive device 2, the cover member 9 and the sensor cover member 11 with respect to the support body 5. In other words, in this embodiment, the lens drive device 2, the angular velocity sensor 4, the cover member 9 and the sensor cover member 11 structure the movable body 12 which is capable of being swung with respect to the support body 5.

(Support Body)

The support body 5 in this embodiment includes, as an example, a base body 15 structuring a center in a height direction of the optical module 100 and a case body 16 which structures four outer peripheral faces of an upper side portion of the photographing optical device 1. The case body 16 is fixed with a plate spring 17 which swingably supports the movable body 12. Further, the case body 16 is fixed with a stopper member 18 for restricting a swing range of the movable body 12.

The base body 15 is formed in a substantially rectangular shape when viewed from an upper side. A substantially center of the base body 15 is formed with a protruded part 15a which is protruded to an upper side. Further, an upper face of the protruded part 15a is formed with a supporting point projection 15b which serves as a swing supporting point of the movable body 12. The supporting point projection 15b is, as an example, formed in a hemisphere face shape and is contacted with a contact face 11a of the sensor cover member 11. In this embodiment, a supporting point part 19 which serves as a swing center of the lens drive device 2 is structured by using the supporting point projection 15b and the contact face 11a.

The case body 16 is formed in a substantially rectangular tube shape whose upper end and lower end are opened. Side faces on front and rear sides and right and left sides of the case body 16 are formed in substantially parallel to the optical axis direction. Further, the base body 15 is fixed to a lower end side of the case body 16.

The plate spring 17 is, as an example, a plate in a substantially rectangular shape when viewed from an upper side (see FIG. 3). Four corners of the plate spring 17 are fixed to the case body 16, and the movable body 12 is fixed to a center part of the plate spring 17. Further, the sensor cover member 11 is fixed to a center part of the plate spring 17, and the plate spring 17 holds a lower end side of the movable body 12. In this embodiment, the plate spring 17 is fixed to the case body 16 through the stopper member 18. In other words, four corners of the plate spring 17 are fixed to the stopper member 18 which is fixed to an inner peripheral face of the case body 16.

The stopper member 18 is fixed to the inner peripheral face of the case body 16. Specifically, two stopper members 18 are fixed to the inner peripheral face of the case body 16 at a position capable of contacting with an upper face of the flange part 9b of the cover member 9 and at a position capable of contacting with an under face of the flange part 11b of the sensor cover member 11. A swing range of the movable body 12 is restricted by the stopper member 18 and the flange parts 9b and 11b.

(Swing Drive Mechanism)

The swing drive mechanism 6 in this embodiment includes, as an example, a swing drive mechanism 6a and a swing drive mechanism 6b.

(Swing Drive Mechanism 6a)

The swing drive mechanism 6a has a function which swings the lens drive device 2 in two directions intersecting the optical axis "L" (as an example, "X" direction and "Y" direction). The swing drive mechanism 6a includes, as shown in FIG. 3, four drive magnets 21 and four drive coils 23 which are disposed so as to face the respective drive magnets 21.

The drive magnet 21 is formed in a substantially rectangular shape when viewed in a radial direction from the optical axis. Further, the drive magnet 21 is structured of two magnet pieces, i.e., a first magnet piece 21a and a second magnet piece 21b. Specifically, the first magnet piece 21a and the second magnet piece 21b are adhesively fixed to each other in a state that an under face of the first magnet piece 21a and an upper face of the second magnet piece 21b are contacted with each other to form the drive magnet 21.

One drive magnet 21 is fixed to each of the front and rear side faces and each of the right and left side faces of the cover member 9 and is swung together with the lens drive device 2.

In this embodiment, the drive magnets 21 fixed to the right and left side faces of the cover member 9 are magnetized so that a magnetic pole formed on a right side face of the drive magnet 21 and a magnetic pole formed on its left side face are different from each other. Further, the drive magnets 21 fixed to the right and left side faces of the cover member 9 are magnetized so that a magnetic pole formed on an outer side face of the first magnet piece 21a in the right and left direction and a magnetic pole formed on an outer side face of the second magnet piece 21b are different from each other.

Similarly, the drive magnets 21 fixed to the front and rear side faces of the cover member 9 are magnetized so that a magnetic pole formed on a front side face of the drive magnet 21 and a magnetic pole formed on its rear side face are different from each other. Further, the drive magnets 21 fixed to the front and rear side faces of the cover member 9 are magnetized so that a magnetic pole formed on an outer side face of the first magnet piece 21a in the front and rear direction and a magnetic pole formed on an outer side face of the second magnet piece 21b are different from each other.

The drive coil 23 is structured by winding a fusion wire having an insulating layer which coats around a conducting wire and a fusion film further coating around the insulating layer, and the drive coil 23 is an air-core coil which is formed in an air-core shape. One drive coil 23 is fixed to each of the front and rear side faces and each of the right and left side faces of the case body 16 through an insulating film.

Further, as shown in FIG. 3, the drive magnet 21 and the drive coil 23 face each other in a state with a gap space "G" therebetween. Specifically, the drive magnets 21 and the drive coils 23 are disposed so as to face each other in a state with a predetermined gap space "G" therebetween so that, even when the movable body 12 is swung with the supporting point part 19 as a supporting point, the drive magnet 21 and the drive coil 23 are not contacted with each other. Further, in this embodiment, the drive magnet 21 and the drive coil 23 are disposed so as to face each other so that a center position of the drive coil 23 in the upper and lower direction is disposed on an upper side with respect to the contact face of the first magnet piece 21a with the second magnet piece 21b.

(Swing Drive Mechanism 6b)

Figure 4:
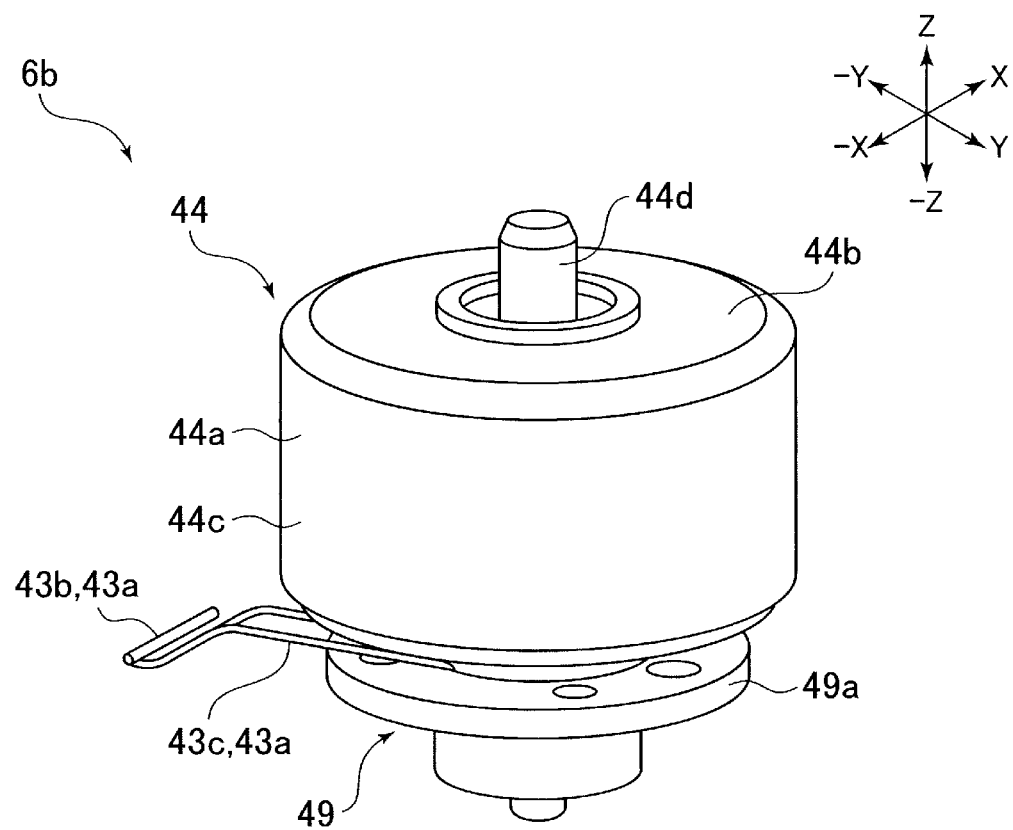
FIG. 4 is an exploded perspective view showing one of swing drive mechanisms which structure a photographing optical device in accordance with an embodiment of the present invention.

The swing drive mechanism 6b has a function which swings the lens drive device 2 in a circumferential direction around the optical axis "L" (as an example, a circumferential direction around the "Z" direction). The swing drive mechanism 6b includes, as shown in FIG. 2 and FIG. 4, a support member (not shown), a stator (not shown), a rotor 44, a bearing holder 49 and a coil wire 43a. In this embodiment, in the swing drive mechanism 6b (see FIG. 4), one end part of a rotation shaft 44d described below is fitted to the protruded part 15a (see FIG. 3) which is formed in the base body 15 of the support body 5. The swing drive mechanism 6b is, as an example, a motor. Further, the swing drive mechanism 6b is accommodated in a rectangular-shaped box disposed to a lower side of the support body 5 in FIG. 2.

The stator (not shown) is held by the support member through the bearing holder 49. The rotor 44 is structured to turn around the optical axis. In this embodiment, the swing drive mechanism 6b is a single phase motor (not shown) and the stator includes a stator core provided with a plurality of salient poles in a circumferential direction and a stator coil wound around the plurality of the salient poles.

The rotor 44 includes, as shown in FIG. 4, a cup-shaped rotor case 44a and the rotation shaft 44d which is fixed to an end plate part 44b of the rotor case 44a. The rotor 44 includes a rotor magnet (not shown) which is held on an inner face of a cylindrical tube shaped body part 44c of the rotor case 44a. The rotor magnet faces the salient poles on an outer side in the radial direction. An inner peripheral face of the rotor magnet which faces the salient poles is a magnetized face where an "S"-pole and an "N"-pole are alternately magnetized at intervals of an equal angle in the circumferential direction. The magnetized face is a face on which a magnetizing head is closely disposed when magnetizing is performed. The body part 44c of the rotor case 44a has a function as a back yoke for the rotor magnet.

The rotation shaft 44d is turnably supported by bearings (not shown) at positions separated in the "Z"-axis direction. The bearing holder 49 is also used as a core holder which holds the stator core. The bearing holder 49 is provided with a circular plate-shaped flange part 49a at a position adjacent to the cylindrical tube part on one side in the "Z"-axis direction. The flange part 49a is fixed to the support member by a screw (not shown).

In the swing drive mechanism 6b in this embodiment, as an example, the number of the salient poles of the stator core around which the stator coil is wound is set to be two times of the number of magnetic poles (sum of the number of "S"-poles and the numerical of "N"-poles) of the rotor magnet. In this embodiment, the number of the magnetic poles of the rotor magnet is four (4) and the number of the salient poles is eight (8). Further, the salient poles are disposed at intervals of an equal angle in the circumferential direction. The stator coil is, as shown in FIG. 4, structured so that one coil wire 43a is wound around the plurality of the salient poles (not shown), and two input terminals 43b and 43c are extended out.

(Swing Drive Mechanism Control Part, Angle Current Value Table and USB Terminal)

The swing drive mechanism control part 7 in this embodiment has, as described above, a function which controls the swing drive mechanism 6 based on a variation of a tilt of the lens drive device 2 with respect to the support body 5 which is detected by the angular velocity sensor 4 and corrects the tilt by the swing drive mechanism 6.

Further, the swing drive mechanism control part 7 in this embodiment is structured so as to include a servo-control circuit and a drive circuit. The swing drive mechanism control part 7 is, as shown in FIG. 5, electrically connected with the angular velocity sensor 4, and an output signal of the angular velocity sensor 4 (angular velocity signal) is inputted into the swing drive mechanism control part 7. Further, the swing drive mechanism 6 is electrically connected with the swing drive mechanism control part 7, and the drive coils 23 of the swing drive mechanism 6a and the input terminals 43b and 43c of the swing drive mechanism 6b are electrically connected with the swing drive mechanism control part 7.

Figure 7:
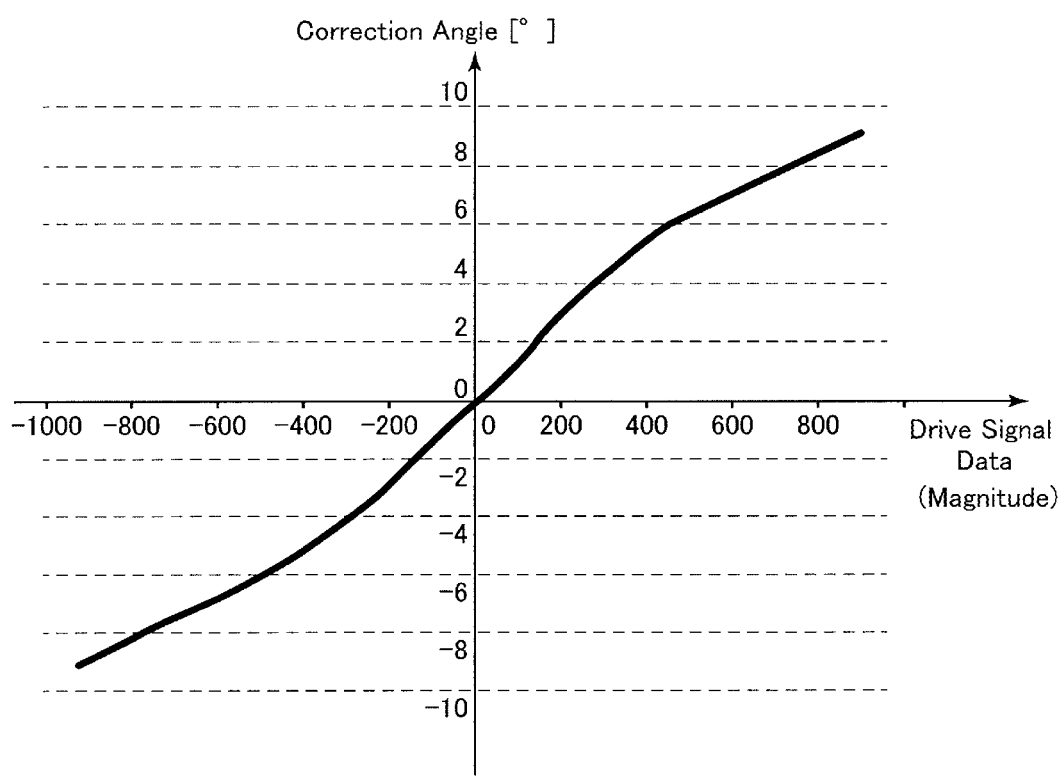
FIG. 7 is a graph showing a relationship between drive signal data of PWM drive and an angle calculated based on an angle current value table in accordance with an embodiment of the present invention.

Further, the swing drive mechanism control part 7 in this embodiment is, as shown in FIG. 5, connected with the angle current value table 32. The angle current value table 32 in this embodiment is stored in a ROM (not shown, an example of a storage section). The angle current value table 32 is a table in which drive signal data outputted to the swing drive mechanism 6 by the swing drive mechanism control part 7 for correcting a tilt of the lens drive device 2 through the drive mechanism 6 by the swing drive mechanism control part 7 correspond to tilt angles (not shown). In this embodiment, FIG. 6 shows a table which is listed with Duty ratios of PWM drive and decimal numbers indicating drive signal data outputted from the swing drive mechanism control part 7 to the swing drive mechanism 6, shake correction angles corresponding to the respective data, decimal numbers and hexadecimal numbers indicating USB output data values corresponding to the respective data. FIG. 7 is a graph showing a relationship between drive signal data of PWM drive and an angle calculated based on the angle current value table 32. In this embodiment, the angle current value table 32 is, as an example, individually set by measuring respective photographing optical devices 1 when a plurality of photographing optical devices 1 is to be manufactured. In other words, the angle current value table 32 in this embodiment is prepared based on results of measurements at the time of manufacturing.

Further, the swing drive mechanism control part 7 in this embodiment outputs an output signal of the angular velocity sensor 4 (in other words, a signal for detecting a variation of an angular velocity of the lens drive device 2) as a signal equivalent to the drive signal data which are outputted to the swing drive mechanism 6 for correcting a tilt of the lens drive device 2, and the USB control part 34 includes a packet conversion part for outputting the equivalent signal to the external device 50. The USB control part 34 is electrically connected with the external device 50 (HOST CPU).

In this embodiment, as shown in FIG. 5, a signal line is provided from the angular velocity sensor 4 to the swing drive mechanism control part 7. Further, the photographing optical device 1 in this embodiment is structured so that a variation of a tilt detected by the angular velocity sensor 4 (signal of information regarding the variation) is capable of being outputted to the external device 50 for a period when the movable body 12 is driven. In other words, in this embodiment, for a period when the swing drive mechanism control part 7 corrects a tilt by the swing drive mechanism 6, the swing drive mechanism control part 7 creates information regarding a variation of a tilt sent from the angular velocity sensor 4 as an equivalent signal to the drive signal data and is capable of outputting the information regarding the variation to the external device 50 from the USB control part 34.

Further, in this embodiment, the camera control part 33 is, as shown in FIG. 5, connected with the imaging element 30, the swing drive mechanism control part 7 and the USB control part 34. The camera control part 33 is structured so that the swing drive mechanism control part 7 corrects a tilt by the swing drive mechanism 6 and picture signal data received from the imaging element 30 are outputted to the external device 50 through the USB terminal "ET".

The photographing optical device 1 in this embodiment outputs the angle current value table 32 and the drive signal data to the external device 50 through the USB terminal "ET" when the external device 50 is connected. The external device 50 stores the angle current value table 32 in a storage section (not shown) provided in the external device 50, and a tilt angle is converted and obtained by using the angle current value table 32 having been stored and the drive signal data received through the camera control part 33 and the USB control part 34 in an operation part (not shown) provided in the external device 50. In this embodiment, when the external device 50 is activated in a state that the external device 50 is connected with the photographing optical device 1, a read signal of an expanded command is sent to the USB control part 34.

The photographing optical device 1 in this embodiment is structured as described above.

(Operation)

Next, an operation of the photographing optical device 1 in this embodiment will be described below with reference to FIG. 2 through FIG. 5.

In the photographing optical device 1 in this embodiment, when a variation of a tilt of the lens drive device 2 is detected by the angular velocity sensor 4, (in other words, when a shake (swing) of the lens drive device 2 is detected), the swing drive mechanism control part 7 controls the swing drive mechanism 6 based on a detected result of the angular velocity sensor 4 to supply an electric current to the drive coils 23 of the swing drive mechanism 6a (see FIG. 3) and to the input terminals 43b and 43c (see FIG. 4) of the swing drive mechanism 6b. Further, when an electric current is supplied to the drive coils 23 and the input terminals 43b and 43c, the movable body 12 is swung (turned) with the supporting point part 19 as a center and thereby the shake is corrected.

As described above, in this embodiment, while performing a shake correction (during control of a shake correction), in other words, for a period that the movable body 12 is driven, the swing drive mechanism control part 7 outputs a variation of a tilt (signal of information regarding a variation of a tilt) detected by the angular velocity sensor 4 to the external device 50 as a signal equivalent to the drive signal data through the camera control part 33 and the USB control part 34. In this case, the photographing optical device 1 outputs image signal data of the camera control part 33 received from the imaging element 30 to the external device 50 through the USB control part 34 and the USB terminal "ET".

The photographing optical device 1 in this embodiment is operated as describe above.

(Effects)

Next, effects in this embodiment (first through fourth effects) will be described below with reference to the accompanying drawings. In order to compare this embodiment with a comparison example described below for explaining effects of this embodiment, when the same structural elements as this embodiment are used in the comparison example, the same reference signs as this embodiment are used.

(First Effect)

For example, in the conventional photographing optical device (not shown, hereinafter, referred to as a first comparison example) disclosed in the above-mentioned Patent Literature 1, during a period when the shake control circuit controls the swing drive mechanism through the swing drive mechanism drive circuit (during a period when the shake control circuit controls the movable body), a signal of the angular velocity sensor is not outputted to the outside (see the paragraph "0042" of the specification in the Patent Literature 1, FIG. 4 and the like). Further, in the conventional photographing optical device in the first comparison example, during a period when a signal of the angular velocity sensor is outputted to the outside, the shake control circuit does not control the swing drive mechanism through the swing drive mechanism drive circuit (see the paragraph "0042" of the specification in the Patent Literature 1, FIG. 4 and the like).

On the other hand, according to this embodiment, different from the above-mentioned first comparison example, during a period when the swing drive mechanism control part 7 makes the swing drive mechanism 6 correct a tilt, the swing drive mechanism control part 7 creates information regarding a variation of the tilt from the angular velocity sensor 4 as a signal equivalent to the drive signal data, and the information regarding the variation are capable of being outputted to the external device 50 from the USB control part 34 (hereinafter, this structure is referred to as a structure for attaining a first effect). Therefore, the photographing optical device 1 in this embodiment is capable of informing the external device of a variation (relative value) of a tilt angle of the lens drive device 2 with respect to the support body 5 during control of a shake correction.

(Second Effect)

On the premise that the photographing optical device 1 in this embodiment includes the structure for attaining the first effect, the photographing optical device 1 includes a ROM (not shown, an example of a storage part) in which the angle current value table 32 is stored (see FIG. 5). Further, the angle current value table 32 which is stored in the photographing optical device 1 in this embodiment is outputted to the external device 50. Further, the external device 50 stores the received angle current value table 32, and a tilt angle is converted by using the angle current value table 32 storing the drive signal data received from the photographing optical device 1. In this case, the external device 50 calculates the angle by comparing a data table (corresponding to the angle current value table 32) associated with each actuator with a data value (corresponding to information regarding a variation of a tilt) outputted to the external device 50 (received by the external device 50) through the camera control part 33, the USB control part 34 and the USB terminal "ET". Therefore, in the photographing optical device 1 in this embodiment, a variation (absolute value) of a tilt angle of the lens drive device 2 can be informed to the external device 50 by using the drive signal data and the angle current value table 32.

(Third Effect)

Further, in this embodiment, on the premise that the photographing optical device 1 includes the structure for attaining the first effect, the angle current value table 32 is, as an example, set by individually measuring each of a plurality of photographing optical devices 1 when the respective photographing optical devices 1 are to be manufactured. In other words, each of a plurality of angle current value tables 32 in this embodiment is set based on an individually measured result when manufactured.

Therefore, in the photographing optical devices 1 in this embodiment, a variation (absolute value) of a tilt angle can be informed to the external device 50 with a high degree of accuracy depending on its individual variation.

(Fourth Effect)

Further, on the premise that the photographing optical device 1 in this embodiment includes the structure for attaining the first effect, image signal data are outputted to the external device 50 together with information regarding a variation of a tilt through the USB terminal "ET" (see FIG. 5).

Therefore, in the photographing optical device 1 in this embodiment, data (as an example, information regarding a variation of a tilt, image signal data and the like) can be outputted to the external device 50 through a standard specification. This embodiment is in conformity with the USB video class which is the USB interface standard. Therefore, it is effective that the data can be easily handled on an OS which is high in versatility such as WINDOWS (registered trademark), Linux (registered trademark) and ANDROID (registered trademark), capable of handling a USB memory, a USB mouse or other USB devices.

Although the present invention has been shown and described with reference to a specific embodiment, various changes and modifications will be apparent to those skilled in the art from the teachings herein. For example, the technical scope of the present invention also includes embodiments described below.

For example, in the descriptions in the above-mentioned embodiment, the photographing optical device 1 as an example of the optical unit is a so-called module tilt type device. However, when an optical unit includes at least the structure for attaining the above-mentioned first effect, an example of the optical unit is not required to be a module tilt type device. For example, the optical unit may be a lens shift type device. Further, the optical unit may be a sensor shift type device.

Further, in the descriptions in the above-mentioned embodiment, the swing drive mechanism 6 as an example of the drive mechanism includes the swing drive mechanism 6a and the swing drive mechanism 6b and the lens drive device 2 is swung in the two directions intersecting the optical axis "L" and in the circumferential direction around the optical axis "L". In other words, the swing drive mechanism 6 in the above-mentioned embodiment is controlled by the swing drive mechanism control part 7 and is swung around three axes to correct a tilt of the lens drive device 2. However, when an optical unit includes at least the structure for attaining the above-mentioned first effect, the swing drive mechanism 6 may be structured of only the swing drive mechanism 6a. Alternatively, the swing drive mechanism 6 may be structured of only the swing drive mechanism 6b. Further, the swing drive mechanism 6 may be structured of only the swing drive mechanism 6a structured to swing the lens drive device 2 around one direction intersecting the optical axis "L". Further, the swing drive mechanism 6 may be structured of the swing drive mechanism 6a structured to swing the lens drive device 2 around one direction intersecting the optical axis "L" and the swing drive mechanism 6b.

Further, in the descriptions in the above-mentioned embodiment, when the external device 50 is connected with the photographing optical device 1, the angle current value table 32 is outputted to the external device 50 through the USB terminal "ET". However, an outputting method of the angle current value table 32 to the external device 50 may be utilized with another method different from the embodiment. For example, it may be structured that the angle current value table 32 is stored as a QR code (registered trademark) or another code at the time of shipment of the photographing optical device 1 and the angle current value table 32 is sent to the external device 50 by using the code.

Further, in the descriptions in the above-mentioned embodiment, the angle current value table 32 is used for converting the drive signal data into a tilt angle. However, a converting method of the drive signal data into a tilt angle is not limited to the angle current value table 32. For example, it may be structured that a calculation expression in conformity with the angle current value table 32 is prepared, the calculation expression is stored in a ROM (not shown), and the drive signal data are converted into a tilt angle by using the calculation expression. According to this modified embodiment, the first, the second and the fourth effects in the above-mentioned embodiment can be attained. Further, when the calculation expression is set on the basis of an individually measured result at the time of manufacturing, also in this modified embodiment, the third effect in the above-mentioned embodiment can be attained.

Further, in the descriptions in the above-mentioned embodiment, the swing drive mechanism control part 7 is connected with the external device 50 through the camera control part 33, the USB control part 34 and the USB terminal "ET". Further, the swing drive mechanism control part 7 is indirectly connected with the external device 50 through the camera control part 33 and the USB control part 34. However, the swing drive mechanism control part 7 may be connected with the external device 50 through the USB terminal "ET", not through the camera control part 33 and the USB control part 34. In other words, the swing drive mechanism control part 7 may be directly connected with the external device 50 through the USB terminal "ET" without passing through the camera control part 33 and the USB control part 34.

Figure 8:
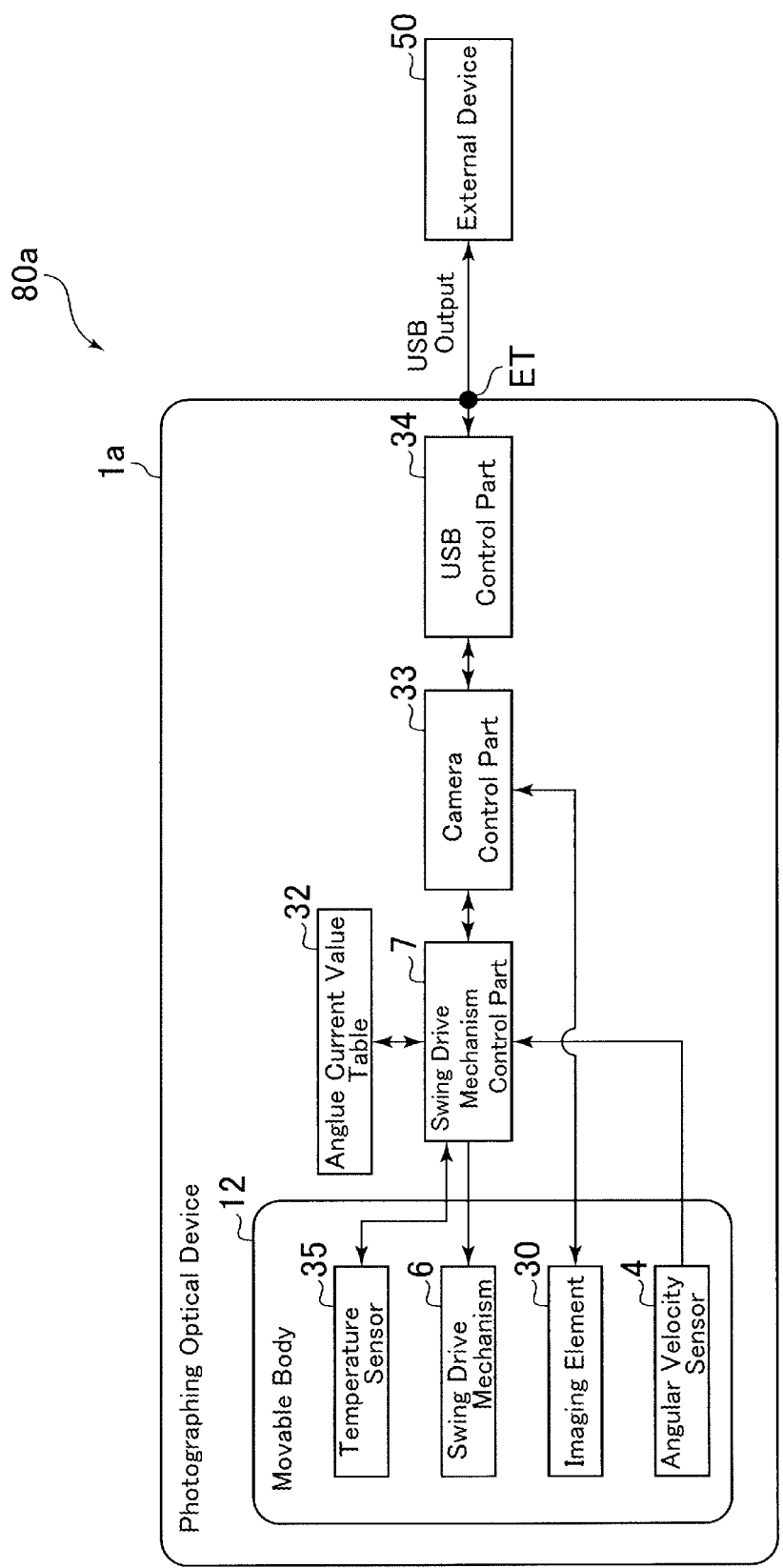
FIG. 8 is a block diagram showing a relationship between respective structural elements which structure a photographing optical device in accordance with a modified embodiment of the present invention and an external device which does not structure the photographing optical device.
Figure 9:
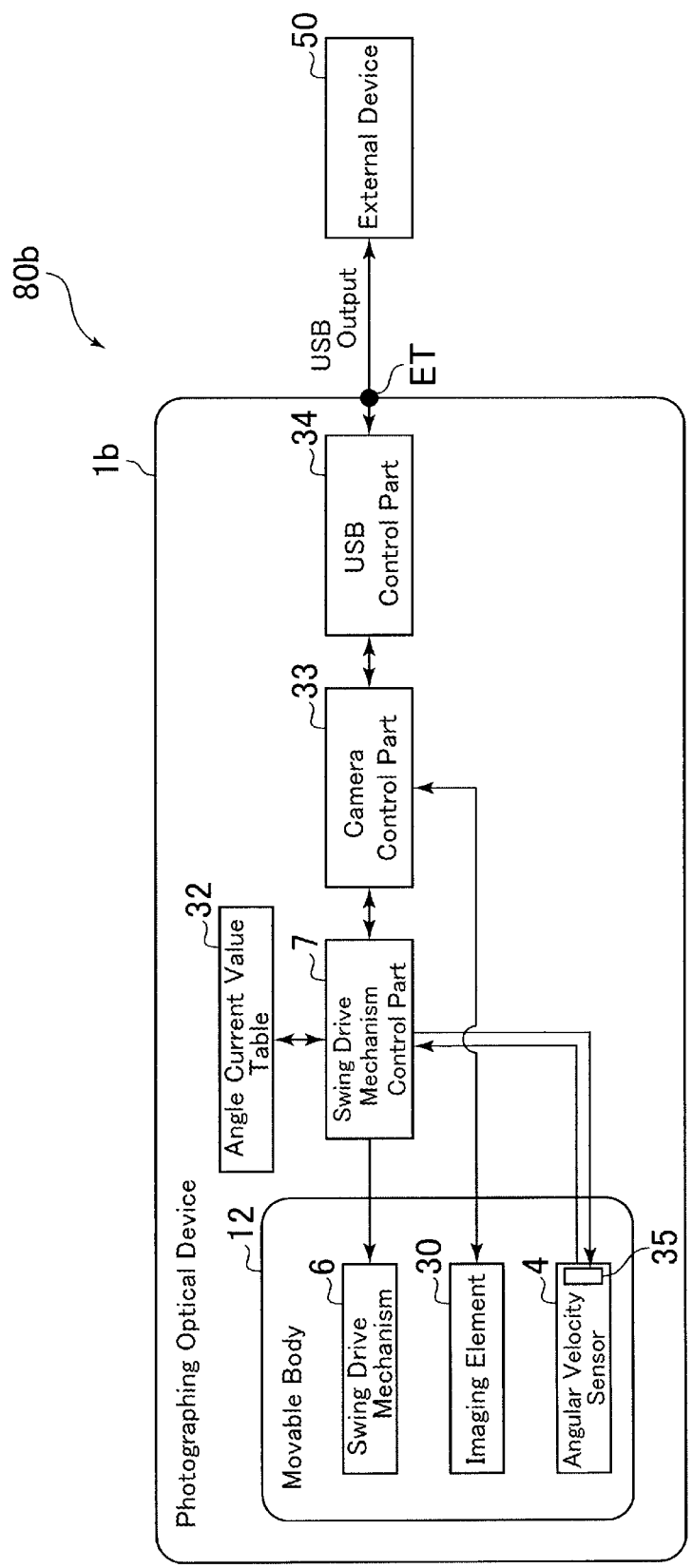
FIG. 9 is a block diagram showing a relationship between respective structural elements which structure a photographing optical device in accordance with a second modified embodiment of the present invention and an external device which does not structure the photographing optical device.

Further, different from the above-mentioned embodiment, like a photographing optical device 1*a* in a modified embodiment shown in FIG. 8, it may be structured that a temperature sensor 35 (example of a temperature detection part) which detects an internal temperature is included in the movable body 12, and that a plurality of the angle current value tables 32 in the above-mentioned embodiment, or a plurality of the calculation expressions in the modified embodiment is used so as to correspond to a temperature detected by the temperature sensor 35. According to this modified embodiment, the angle current value table 32 or the calculation expression in the above-mentioned modified embodiment is set based on the internal temperature and thus a variation of a tilt of the lens drive device 2 can be informed to the external device 50 with a high degree of accuracy depending on temperature change. In accordance with an embodiment of the present invention, like a photographing optical device 1*b* in a modified embodiment shown in FIG. 9, it may be structured that a temperature sensor 35 which detects the internal temperature is mounted on the angular velocity sensor 4. Also in this modified embodiment, the temperature sensor 35 is connected with the swing mechanism control part 7.

A combination of the photographing optical device 1 in the embodiment with the external device 50 may be regarded as an example of the optical system 80 (see FIG. 5). The optical system 80 can be attained at least an effect that the external device 50 is capable of obtaining a variation of a tilt of the lens drive device 2 with respect to the support body 5 while a shake correction is controlled in the photographing optical device 1. Also in the optical system 80*a* (see FIG. 8) in which the photographing optical device 1*a* in the modified embodiment and the external device 50 are combined with each other, similar effects to the optical system 80 can be attained.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit comprising:
    a lens drive device on which an optical element is mounted;
    a support body which movably supports the lens drive device;
    a detecting part structured to detect a variation of a tilt of the lens drive device with respect to the support body;
    a swing drive mechanism structured to change a tilt of the lens drive device with respect to the support body;
    an output part structured to connect with an external device;
    a swing drive mechanism control part structured to control the swing drive mechanism based on the variation detected by the detecting part to swing the lens drive device by the swing drive mechanism to correct the tilt of the lens drive device; and
    an output control part structured to create information regarding the variation of the tilt of the lens drive device as a signal equivalent to drive signal data which are outputted to the swing drive mechanism for correcting the tilt of the lens drive device from the swing drive mechanism control part and output the information regarding the variation of the tilt of the lens drive device to the external device during a period when the swing drive mechanism control part makes the swing drive mechanism correct the tilt of the lens drive device.

2. The optical unit according to claim 1, further comprising a storage part stored with a table in which the drive signal data and an angle of the tilt correspond to each other,
    wherein the table is outputted from the optical unit to the external device and is stored in the external device, and
    wherein the drive signal data are outputted from the swing drive mechanism control part to the external device and converted into a tilt angle by using the table in the external device.

3. The optical unit according to claim 2, wherein the table is set based on a result of measurement at a time of manufacturing.

4. The optical unit according to claim 2, further comprising a temperature detection part structured to detect an internal temperature,
    wherein the table comprises a plurality of the tables so as to correspond to temperatures detected by the temperature detection part.

5. The optical unit according to claim 1, further comprising a storage part stored with a calculation expression in which the drive signal data and an angle of the tilt correspond to each other,
    wherein the calculation expression is outputted from the optical unit to the external device and is stored in the external device, and
    wherein the drive signal data are outputted from the swing drive mechanism control part to the external device and converted into a tilt angle by using the calculation expression in the external device.

6. The optical unit according to claim 5, wherein the calculation expression is set based on a result of measurement at a time of manufacturing.

7. The optical unit according to claim 5, further comprising a temperature detection part structured to detect an internal temperature,
    wherein the calculation expression comprises a plurality of the calculation expressions so as to correspond to temperatures detected by the temperature detection part.

8. The optical unit according to claim 1, further comprising a USB terminal structured to connect with the external device, wherein the optical unit outputs image signal data together with the information regarding the variation to the external device through the USB terminal.

9. The optical unit according to claim 8, further comprising a storage part stored with a table in which the drive signal data and an angle of the tilt correspond to each other,
wherein the table is outputted from the optical unit to the external device and is stored in the external device, and
wherein the drive signal data are outputted from the swing drive mechanism control part to the external device and converted into a tilt angle by using the table in the external device.

10. The optical unit according to claim 9, wherein the table is set based on a result of measurement at a time of manufacturing.

11. The optical unit according to claim 9, further comprising a temperature detection part structured to detect an internal temperature,
wherein the table comprises a plurality of the tables so as to correspond to temperatures detected by the temperature detection part.

12. The optical unit according to claim 8, further comprising a storage part stored with a calculation expression in which the drive signal data and an angle of the tilt correspond to each other,
wherein the calculation expression is outputted from the optical unit to the external device and is stored in the external device, and
wherein the drive signal data are outputted from the swing drive mechanism control part to the external device and converted into a tilt angle by using the calculation expression in the external device.

13. The optical unit according to claim 12, wherein the calculation expression is set based on a result of measurement at a time of manufacturing.

14. The optical unit according to claim 12, further comprising a temperature detection part structured to detect an internal temperature,
wherein the calculation expression comprises a plurality of the calculation expressions so as to correspond to temperatures detected by the temperature detection part.

15. An optical system comprising:
the optical unit defined in claim 1; and
the external device which is connected with the detecting part structured to detect the variation of the tilt.

16. The optical system according to claim 15, wherein
the optical unit comprises a storage part stored with a table in which the drive signal data and an angle of the tilt correspond to each other,
the table is outputted from the optical unit to the external device and is stored in the external device, and
the drive signal data are outputted from the swing drive mechanism control part to the external device and converted into a tilt angle by using the table in the external device.

17. The optical system according to claim 16, wherein the table is set based on a result of measurement at a time of manufacturing.

18. The optical system according to claim 16, wherein
the optical unit comprises a temperature detection part structured to detect an internal temperature, and
the table comprises a plurality of the tables so as to correspond to temperatures detected by the temperature detection part.

19. The optical system according to claim 15, wherein
the optical unit comprises a storage part stored with a calculation expression in which the drive signal data and an angle of the tilt correspond to each other,
the calculation expression is outputted from the optical unit to the external device and is stored in the external device, and
the drive signal data are outputted from the swing drive mechanism control part to the external device and converted into a tilt angle by using the calculation expression in the external device.

20. The optical system according to claim 15, wherein
the optical unit comprises a USB terminal structured to connect with the external device, and
the optical unit outputs image signal data together with the information regarding the variation to the external device through the USB terminal.

* * * * *